Sept. 27, 1960 W. A. MINER 2,954,422

TELEGRAPHIC SYSTEM DELAY NETWORK

Filed July 29, 1952

INVENTOR.
WALTER A. MINER

BY [signature]

ATTORNEY

United States Patent Office 2,954,422

Patented Sept. 27, 1960

2,954,422

TELEGRAPHIC SYSTEM DELAY NETWORK

Walter Adrian Miner, Bayside, N.Y., assignor to International Telephone and Telegraph Corporation, a corporation of Maryland

Filed July 29, 1952, Ser. No. 301,486

6 Claims. (Cl. 178—2)

This invention relates to a delay circuit network to produce a delayed non-distorted output signal in response to an input signal, and particularly to such a network which may be associated with a telegraphic communication system.

This system is particularly adapted for operation in conjunction with carrier telegraphy, 2 or 4 wire system, wherein the system is prepared for transmitting or receiving by means of a switching device; e.g., a relay. The delay network is positioned in the path of the receiving signals and serves to delay the signals sufficiently to insure complete operation of a switching device operated by a control circuit, without distorting the signal train.

An object of the invention is to provide a novel combination in a telegraphic communication network, comprising a switching device, and a delay circuit operatively connected thereto and positioned in the path of the receiving signals for providing the desired time delay without distorting the telegraph signals.

Another object of my invention is to provide a novel delay circuit capable of delaying the entire signal train a predetermined amount of time without changing the duration of the individual signal elements.

In accordance with one aspect of my invention there is provided a telegraph signalling system utilizing signal elements of two different characteristics in different combinations to represent discrete signal intelligence. The system comprises means for switching the system from a receiving condition to a transmitting condition and vice versa, means for actuating the switching means upon receiving said signal elements, and means for delaying the transition of the signal elements from one to the other of said characteristics without distorting said signals. The delay means is so connected to the operating means that the switching means is fully operated before the delay means passes the signal therethrough.

In accordance with another aspect of my invention there is provided a circuit network to produce a delayed output signal in response to an input signal. The network comprises first and second energy storage devices with a slow-rate charging circuit for each of the storage devices. Means are provided which are responsive to a first input signal for discharging the first energy storage device. The second energy storage device is discharged through a normally conducting discharge circuit. Responsive to the discharge of the first energy storage device there is provided means for blocking the discharge circuit of the second energy storage device thereby causing the second energy storage device to become charged over its slow-rate charging circuit. An output means which is responsive to the charge on the second energy storage device is provided for producing the delayed output signal.

The above-mentioned and other features and objects of this invention and the manner of attaining them will become more apparent and the invention itself will be best understood, by reference to the following description of an embodiment of the invention taken in conjunction with the accompanying drawings, wherein.

Although the subject matter of this invention is particularly applicable to a telegraph signalling system, and in one aspect forms a novel combination therewith, it is to be realized that the delay circuit, forming another aspect of the invention, has significance in other systems and is not to be limited to a specific type of communication system.

Figure 1:
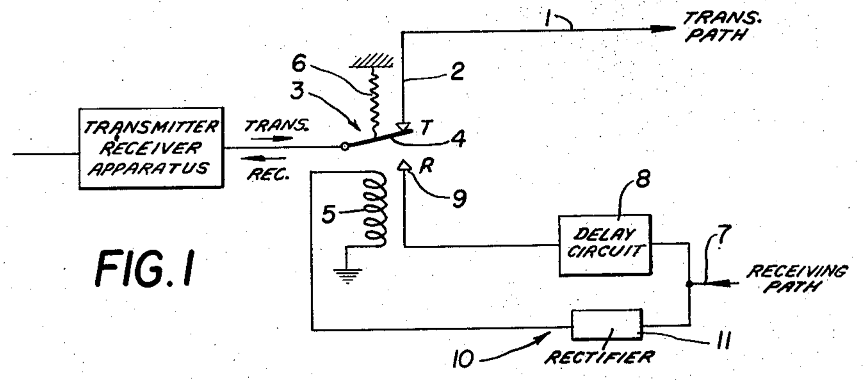
Fig. 1 shows a part of a telegraph communication system.

Referring to Fig. 1, there is shown a telegraph signalling system comprising transmitter-receiver apparatus (shown schematically) for transmitting and receiving telegraph signals. A transmission path 1 is connected from the transmitter apparatus over a contact 2 in normally closed position with a switching means 3, which may be a relay having an armature 4 and a winding 5. The relay armature may be held in its normal position by any of the well known means; e.g., a spring 6. A receiving path 7 is connected to the receiver apparatus over a delay network 8 and contact 9. The incoming signal is received over path 7 and a part of the energy is transferred over a control circuit 10 to ground. The control circuit may include a rectifier 11 to rectify the energy for winding 5. Therefore, upon receiving the incoming energy, winding 5 is energized to move the armature 4 into the receiving position (R) and close the connection between the receiving path 7 and the receiver apparatus. However, to insure complete operation of the relay, which of course takes a finite amount of time, the receiving signal is passed through a delay network 8 which delays the signal for a greater length of time than the relay operating time. Thus, the complete incoming signal train is transferred to the receiver apparatus without the fault, which might result from incomplete relay or switch operation.

Figure 2:
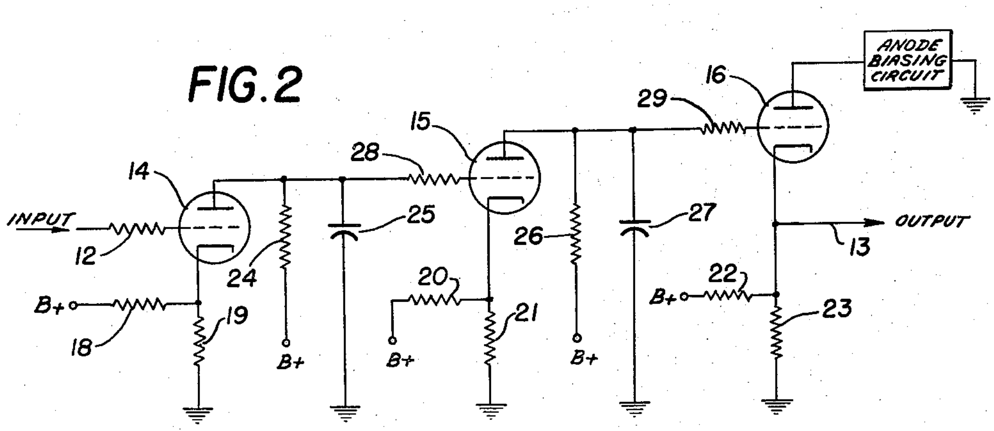
Fig. 2 is a schematic diagram of a delay circuit.

Referring now to Fig. 2, there is shown in detail the delay circuit 8 shown schematically in Fig. 1. The delay circuit comprises an input signal circuit 12 connected to the first of a group of conductive elements, and an output signal circuit 13 connected from the last conductive element of this group. Preferably, the conductive elements are electron tubes of the triode type and the group comprises tubes 14, 15 and 16 respectively. The biasing connections may be such as to impose a positive potential on the cathodes of each of these tubes. For example, tube 14 is biased over a voltage divider network comprising resistors 18, 19 connected between B+ and ground. Similarly tubes 15 and 16 are biased by voltage divider networks comprising resistors 20, 21, and 22, 23 respectively. A first slow-rate RC charging circuit consisting of a resistor 24 and a capacitor 25 is connected between the plate of tube 14 and the grid of tube 15, and a second slow-rate charging circuit consisting of a resistor 26 and a capacitor 27 is connected between the plate of tube 15 and the grid of tube 16. Each of the RC circuits are connected in series between B+ and ground, and the capacitors 25, 27 are connected across tubes 14 and 15 respectively, with the positive terminals of the capacitors 25, 27 connected to the grids of the tubes 15 and 16 respectively.

The operation of the delay circuit may be explained assuming two initial conditions; the first of which the applied signal is not sufficiently positive to fire tube 14, and the second where the applied signal is such as to fire tube 14. Assuming the first condition, where an insufficient positive voltage is applied to circuit 12 of the first tube, then the voltage divider action of resistors 18 and 19 applies a positive potential to the cathode of tube 14 such as to maintain this tube non-conductive. The high resistance path, resistor 24 in series with the plate supply voltage (B+) is established across the capacitor 25, thus charging the capacitor to a high potential which is substantially the potential of the plate supply voltage, after a time exceeding the time constant, and is positive at the junction of resistor 24 and grid resistor 28. The cathode of tube 15 is maintained positive by the voltage divider action of resistors 20 and 21 respectively. However, the capacitor 25 has sufficient voltage thereacross to render tube 15 conducting under the assumed initial conditions. The high resistance path, resistor 26 in series with the plate supply voltage (B+) across capacitor 27 is effectively short-circuited by the low conduction resistance path of tube 15. Therefore, a low potential exists across the capacitor 27. The voltage divider action of resistors 22 and 23 provides a high positive potential on the cathode of tube 16 and the low potential across capacitor 27 which is applied to the grid of tube 16 is insufficient to render tube 16 conducting.

Now assuming a positive voltage is applied to the input circuit 12 which is high enough to counteract the positive cathode voltage and therefore renders tube 14 conducting, then the high resistance path across capacitor 25 becomes effectively short-circuited by the relatively low impedance of tube 14, and capacitor 25 discharges rapidly therethrough. The positive potential is removed from the grid of tube 15 very quickly, and at some point in the short discharge cycle of capacitor 25, the plate current of this tube is cut-off. The low impedance discharge path across capacitor 27 is removed and a high resistance charging path is established by resistor 26 in series with the plate supply voltage. Capacitor 27, therefor starts charging. A potential, positive at the junction of resistors 26 and 29, starts to build up across capacitor 27, and after a predetermined amount of time, determined by the time constant of resistor 26 and capacitor 27, the potential across capacitor 27 is high enough to counteract the high positive voltage on the cathode of tube 16 and this tube becomes conducting.

Thus, the effects of a first transition in the character of the signal at the input of tube 14 is transferred to tube 16 only after a given delay because of the slow charging action of capacitor 27.

When a negative voltage is again applied to the grid of tube 14 over the input circuit 12, the plate current of this tube is cut-off. The low impedance discharge path for capacitor 25 is removed and therefore the capacitor 25 slowly starts to charge through resistor 24 and a slowly increasing positive potential appears at the grid of tube 15. A given amount of time after the appearance of the negative signal at the input circuit 12, the time being determined by the RC constant of resistor 24 and capacitor 25, the potential across capacitor 25 is high enough to cause tube 15 to become conducting.

Thus, the effects of a second transition in the character of the signal at the input of tube 14 is transferred to tube 15 only after a given delay because of the slow charging action of C25. Upon tube 25 becoming conducting, a rapid discharge path is established across capacitor 27 by the low conducting impedance of tube 15 and the positive potential at the grid of tube 16 is quickly removed. The plate current of tube 16 is cut-off and the output signal is varied accordingly.

Figure 3:
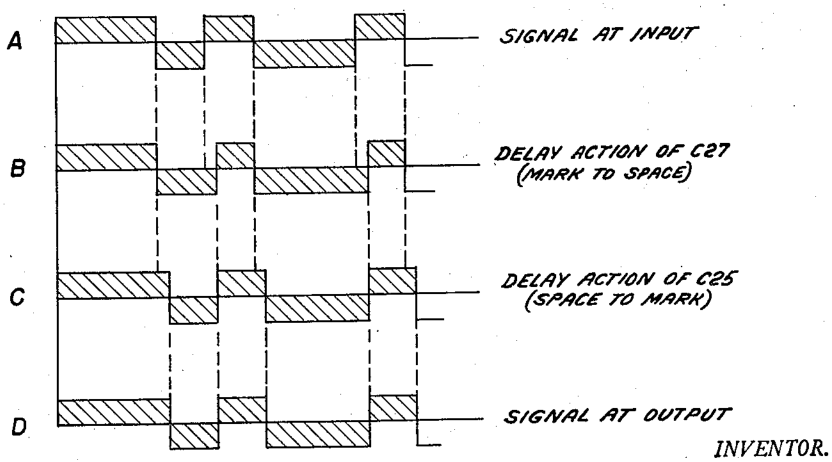
Fig. 3 shows, in graphical form, the effect of the delay circuit on the complete signal train.

As an example of an application of the delay circuit in the telegraphy system, an oscillator may be connected to the output circuit 13 whereby the oscillations are varied in accordance with the conductive condition of tube 16. To the input of tube 14, signals having two different characteristics are applied; these signals may be designated as mark and space signals. Assuming the mark signal to have a negative characteristic and the space signal to have a positive characteristic at the input of tube 14, then as may be seen from Fig. 3 (B, C) the transition from mark to space is delayed by virtue of capacitor 27 and the transition from space to mark is delayed by virtue of capacitor 25. However, since both transitions of the two characteristic signals are similarly delayed, the output signal train is delayed by an amount equal to either of said delays, and there is no change in the duration of the individual signal elements; i.e., no distortions exist in the telegraph signals (see Fig. 3, D).

While I have described above the principles of my invention in connection with specific apparatus, it is to be clearly understood that other type elements may be substituted for those described hereinabove; for example, gas type tubes may be used in place of the electron with certain minor changes in circuit connections, and that this description is made only by way of example and not as a limitation to the scope of my invention as set forth in the objects thereof and in the accompanying claims.

What is claimed is:

1. A telegraph signalling system comprising means for transmitting and receiving telegraph signals comprising mark and space signals having different potential characteristics, means for switching the system from a receiving condition to a transmitting condition and vice versa, a first circuit controlling the operation of said switching means, a second circuit connected to said control circuit and operatively connected to said switching means, said second circuit comprising a delay device for providing a time delay path for said signals, an input signal circuit connected to the junction of said first and second circuits, means including said control circuit for operating said switching means in response to a signal over said input circuit, said delay device comprising a group of three controllable conductive devices, first and second slow-rate charging circuits connected between the first and second, and second and third conductive devices, respectively, said charging circuits comprising a first and second capacitor, respectively, means responsive to a given input signal for rendering said first conductive device conducting to establish a discharge circuit therethrough for said first capacitor, said second conductive device being normally conductive to provide a discharge circuit for said second capacitor, means responsive to the discharge of said first capacitor for rendering said second conductive device non-conducting thereby blocking the discharge circuit of said second capacitor and causing the second capacitor to become charged over its slow-rate charging circuit, and an output means including said third conductive device responsive to a given charge on said second capacitor for producing delayed output signals.

2. The signalling system according to claim 1, wherein said switching means comprises a relay, said control circuit being connected to the winding of said relay, an armature for said relay connected to said telegraph receiving means, and a contact for said armature connected to said second circuit, whereby in response to a signal the winding is energized over the control circuit thereby moving said armature to close the connection between the second circuit and the receiving means.

3. A circuit network to produce delayed output signals in response to telegraph mark and space signals having different potential characteristics, comprising a group of three controllable conductive devices, first and second slow-rate charging circuits connected between the first and second, and second and third conductive devices respectively, said charging circuits comprising a first and second capacitor respectively, means responsive to a given input signal for rendering said first conductive device conducting to establish a discharge circuit therethrough for said first capacitor, said second conductive device being normally conductive to provide a discharge circuit for said second capacitor, means responsive to the discharge of said first capacitor for rendering said second conductive device non-conducting thereby blocking the discharge circuit of said second capacitor and causing the second capacitor to become charged over its slow-rate charging circuit, and an output means including said third conductive device responsive to a given charge on said second capacitor for producing delayed output signals.

4. The circuit according to claim 3, wherein said conductive devices are electron tubes.

5. The circuit according to claim 4, wherein said electron tubes have an anode, a grid and a cathode, said first slow-rate charging circuit being connected between the anode of the first tube and the grid of the second tube and the second slow-rate charging circuit being connected between the anode of the second tube and the grid of the third tube, and said first and second capacitors being connected across said first and second tubes respectively, whereby the capacitor is substantially short-circuited when the associated tube is conducting.

6. A circuit network to produce a delayed output signal in response to an input signal, comprising a direct voltage supply, a group of three electron conducting triode tubes, an input signal circuit connected to the grid of the first tube, first and second charging circuits connected between the plate and grid circuits of the first and second, and second and third triodes respectively, each of said charging circuits comprising a resistor and capacitor in series connection between said voltage supply and ground, the capacitors being connected across said first and second tubes respectively and having their positive terminals connected to the grids of the second and third tubes respectively, means including biasing connections between the voltage supply and ground for normally rendering said second tube conducting thereby providing a discharge circuit for said second capacitor, means responsive to a given input signal for rendering said first tube conducting thereby establishing a discharge circuit for said first capacitor whereby the voltage from the grid of the second tube is removed and the second tube is rendered non-conducting, thereupon blocking the discharge circuit of said second capacitor and causing the second capacitor to become charged over its charging circuit, and the third tube being responsive to a given charge on said second capacitor for producing a delayed output signal.

References Cited in the file of this patent

UNITED STATES PATENTS

| | | |
|---|---|---|
| 1,531,598 | Cummings | Mar. 31, 1925 |
| 1,535,244 | Percival | Apr. 28, 1925 |
| 1,541,878 | Watson | June 16, 1925 |
| 1,673,445 | Dudley | June 12, 1928 |
| 2,349,447 | Seeley | Oct. 3, 1944 |
| 2,360,857 | Eldredge | Oct. 24, 1944 |
| 2,433,667 | Hollingsworth | Dec. 30, 1947 |
| 2,513,954 | Moe | July 4, 1950 |
| 2,521,623 | Arndt | Sept. 5, 1950 |
| 2,534,264 | Hoeppner | Dec. 19, 1950 |
| 2,590,783 | Mayer | Mar. 25, 1952 |
| 2,600,270 | Saunders | June 10, 1952 |
| 2,612,605 | Ranks | Sept. 30, 1952 |
| 2,672,556 | Leighton | Mar. 16, 1954 |
| 2,700,067 | Lockemann | Jan. 18, 1955 |

FOREIGN PATENTS

| | | |
|---|---|---|
| 446,698 | Italy | Mar. 23, 1949 |